(12) United States Patent
    Sherman

(10) Patent No.: US 9,980,154 B2
(45) Date of Patent: May 22, 2018

(54) DIRECTIONAL BROADCASTING METHOD

(71) Applicant: BAE SYSTEMS INFORMATION AND ELECTRONIC SYSTEMS INTEGRATION INC., Nashua, NH (US)

(72) Inventor: Matthew J. Sherman, Succasunna, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 40 days.

(21) Appl. No.: 15/293,938

(22) Filed: Oct. 14, 2016

(65) Prior Publication Data

US 2017/0111905 A1    Apr. 20, 2017

Related U.S. Application Data

(60) Provisional application No. 62/242,340, filed on Oct. 16, 2015.

(51) Int. Cl.
*H04W 72/04* (2009.01)
*H04W 16/28* (2009.01)
*H04B 7/06* (2006.01)
*H04W 88/18* (2009.01)

(52) U.S. Cl.
CPC .......... *H04W 16/28* (2013.01); *H04B 7/0697* (2013.01); *H04W 88/18* (2013.01)

(58) Field of Classification Search
CPC ..... H04W 16/28; H04W 88/18; H04B 7/0697
See application file for complete search history.

(56) References Cited

U.S. PATENT DOCUMENTS

| | | | |
|---|---|---|---|
| 2007/0153707 A1* | 7/2007 | Thubert | H04L 45/025 370/254 |
| 2009/0034489 A1* | 2/2009 | Adams | H04W 72/082 370/337 |
| 2009/0141653 A1* | 6/2009 | McNeill | H04W 84/20 370/254 |

* cited by examiner

*Primary Examiner* — Thai Nguyen
(74) *Attorney, Agent, or Firm* — Sand & Sebolt, LPA

(57) ABSTRACT

The current disclosure is directed to broadcasting information among nodes in the network. More specifically, the current disclosure relates to directional networking among nodes in the network. The directional broadcasting system allows for a more efficient way to deliver broadcasting information among nodes where at least some of the nodes use directional antennas.

19 Claims, 15 Drawing Sheets

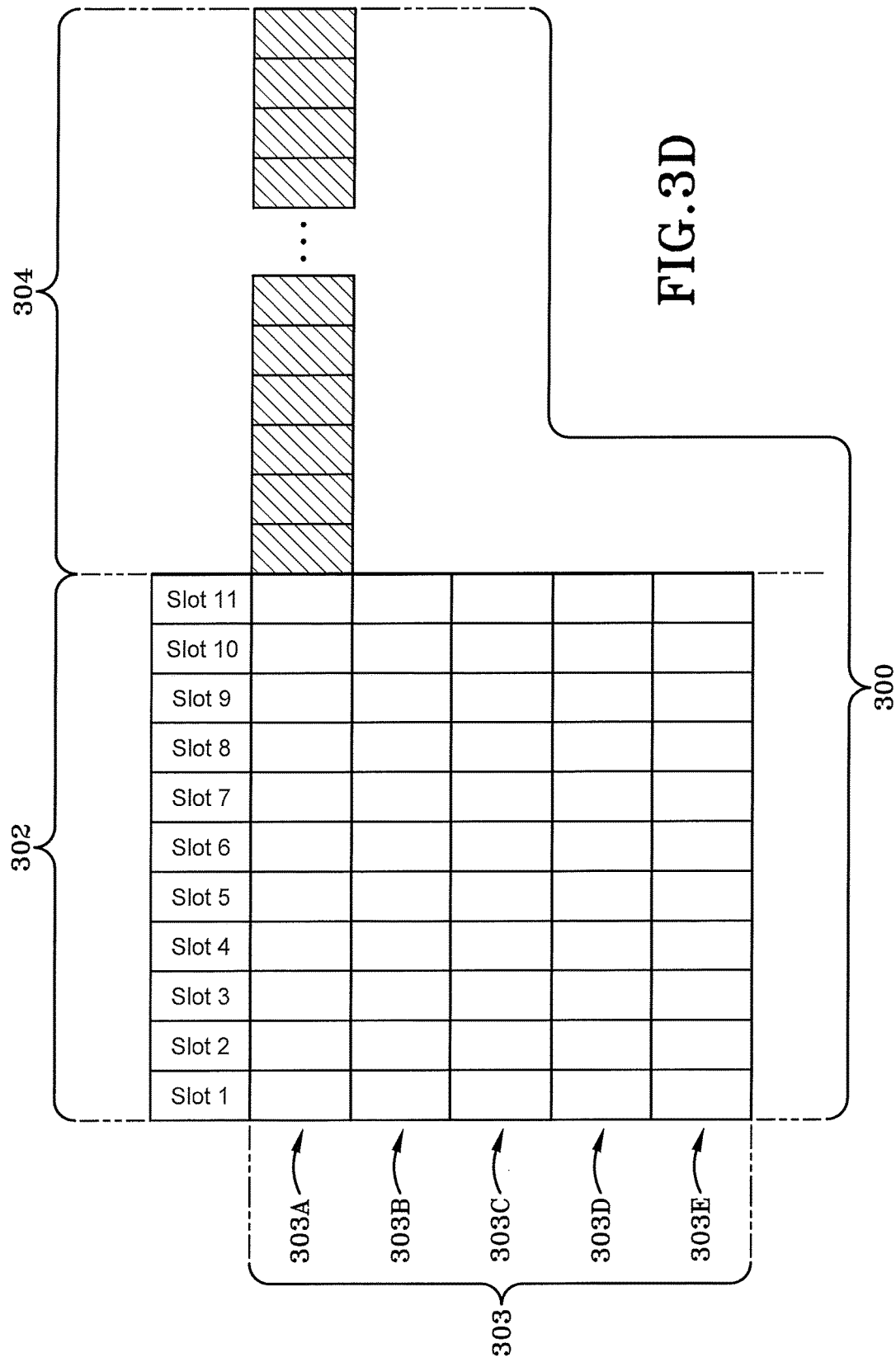

| Slot 1 | L | U | | Slot 2 | L | U | | Slot 3 | L | U | | Slot 4 | L | U | | Slot 5 | L | U | | Slot 6 | L | U | | Slot 7 | L | U |
|---|---|---|---|---|---|---|---|---|---|---|---|---|---|---|---|---|---|---|---|---|---|---|---|---|
| | 01 | 08 | | | 01 | 09 | | | 01 | 10 | | | 01 | 11 | | | 01 | 12 | | | 01 | 13 | | | 01 | 14 |
| | 02 | 09 | | | 02 | 10 | | | 02 | 11 | | | 02 | 12 | | | 02 | 13 | | | 02 | 14 | | | 02 | 08 |
| | 03 | 10 | | | 03 | 11 | | | 03 | 12 | | | 03 | 13 | | | 03 | 14 | | | 03 | 08 | | | 03 | 09 |
| | 04 | 11 | | | 04 | 12 | | | 04 | 13 | | | 04 | 14 | | | 04 | 08 | | | 04 | 09 | | | 04 | 10 |
| | 05 | 12 | | | 05 | 13 | | | 05 | 14 | | | 05 | 08 | | | 05 | 09 | | | 05 | 10 | | | 05 | 11 |
| | 06 | 13 | | | 06 | 14 | | | 06 | 08 | | | 06 | 09 | | | 06 | 10 | | | 06 | 11 | | | 06 | 12 |
| | 07 | 14 | | | 07 | 08 | | | 07 | 09 | | | 07 | 10 | | | 07 | 11 | | | 07 | 12 | | | 07 | 13 |

| Slot 8 | | | | Slot 9 | | | | Slot 10 | | | | Slot 11 | | | | Slot 12 | | | | Slot 13 | | | | Slot 14 | | |
|---|---|---|---|---|---|---|---|---|---|---|---|---|---|---|---|---|---|---|---|---|---|---|---|---|---|---|
| L1 | | U1 | | L1 | | U1 | | L1 | | U1 | | L1 | | U1 | | L1 | | U1 | | L1 | | U1 | | L1 | | U1 |
| 01 | ↔ | 05 | | 01 | ↔ | 06 | | 01 | ↔ | 07 | | 01 | ↔ | P08 | | 01 | ↔ | 03 | | 01 | ↔ | 04 | | 01 | ↔ | 02 |
| 02 | ↔ | 06 | | 02 | ↔ | 07 | | 02 | ↔ | P08 | | 02 | ↔ | 05 | | 02 | ↔ | 04 | | 02 | ↔ | 03 | | | | |
| 03 | ↔ | 07 | | 03 | ↔ | P08 | | 03 | ↔ | 05 | | 03 | ↔ | 06 | | | | | | | | | | L2 | | U2 |
| 04 | ↔ | P08 | | 04 | ↔ | 05 | | 04 | ↔ | 06 | | 04 | ↔ | 07 | | L2 | | U2 | | L2 | | U2 | | 03 | ↔ | 04 |
| | | | | | | | | | | | | | | | | 05 | ↔ | 07 | | 05 | ↔ | P08 | | | | |
| L2 | | U2 | | L2 | | U2 | | L2 | | U2 | | L2 | | U2 | | 06 | ↔ | P08 | | 06 | ↔ | 07 | | L3 | | U3 |
| 08 | ↔ | 12 | | 08 | ↔ | 13 | | 08 | ↔ | 14 | | 08 | ↔ | P15 | | | | | | | | | | 05 | ↔ | 06 |
| 09 | ↔ | 13 | | 09 | ↔ | 14 | | 09 | ↔ | P15 | | 09 | ↔ | 12 | | L3 | | U3 | | L3 | | U3 | | | | |
| 10 | ↔ | 14 | | 10 | ↔ | P15 | | 10 | ↔ | 12 | | 10 | ↔ | 13 | | 08 | ↔ | 10 | | 08 | ↔ | 11 | | L4 | | U4 |
| 11 | ↔ | P15 | | 11 | ↔ | 12 | | 11 | ↔ | 13 | | 11 | ↔ | 14 | | 09 | ↔ | 11 | | 09 | ↔ | 10 | | 07 | ↔ | P08 |
| | | | | | | | | | | | | | | | | | | | | | | | | | | |
| | | | | | | | | | | | | | | | | L4 | | U4 | | L4 | | U4 | | L5 | | U5 |
| | | | | | | | | | | | | | | | | 12 | ↔ | 14 | | 12 | ↔ | P15 | | 08 | ↔ | 09 |
| | | | | | | | | | | | | | | | | 13 | ↔ | P15 | | 13 | ↔ | 14 | | | | |
| | | | | | | | | | | | | | | | | | | | | | | | | L6 | | U6 |
| | | | | | | | | | | | | | | | | | | | | | | | | 10 | ↔ | 11 |
| | | | | | | | | | | | | | | | | | | | | | | | | L7 | | U7 |
| | | | | | | | | | | | | | | | | | | | | | | | | 12 | ↔ | 13 |
| | | | | | | | | | | | | | | | | | | | | | | | | L8 | | U8 |
| | | | | | | | | | | | | | | | | | | | | | | | | 14 | ↔ | P15 |

FIG. 5B

DIRECTIONAL BROADCASTING METHOD

CROSS REFERENCE TO RELATED APPLICATIONS

This application claims the benefit of U.S. Provisional Application Ser. No. 62/242,340, filed on Oct. 16, 2015; the entire disclosure of which is incorporated herein by reference.

BACKGROUND

Technical Field

Generally, the present disclosure relates to communication systems. More particularly, the present disclosure relates to a method of directional networking. Specifically, the present disclosure is directed to a method of broadcasting information within a wireless network wherein at least some of the nodes within the system use directional antennas.

Background Information

Directional networking is a set of networking and related protocols using one or more directional antennas may be used (for example) in the implementation of Mobile Ad-hoc Networks (MANET). Directional networking is an approach to network and protocol design that focuses on radio devices using directional antennas, as opposed to omni-directional antennas. Directional networking has become popular in military systems with examples being Future Combat Systems—Communications (FCS-C) and Highband Networking Radio (HNR), but more recently this type of networking has started to find application in commercial systems such as IEEE 802.11 and 802.15.

Directional networking systems are often developed in support of MANET network topologies but can also be applied in other topologies such as point to multi-point (PMP) or even point to point (PTP). Many networking protocols require the ability to broadcast information in certain contexts. The term "broadcasting" is used herein to mean distributing data to all nodes capable of hearing transmissions from all nodes that are sending transmissions. Examples of when broadcasting might be needed include when sending a beacon to support discovery or sharing of routing and scheduling tables.

Currently known directional antenna systems tend to be very inefficient when broadcasting information relative to systems that broadcast with omni-directional antenna. Using an omni-directional antenna, a single transmission will reach all nodes that are within communications range at once. However, with a directional antenna only a subset of nodes within communications range may be reached with a single transmission. Because of this, the broadcast must be broken down into multiple transmissions and repeated so that it will reach all nearby nodes. Depending on node distributions and antenna patterns, this method of broadcasting may take a very long time compared to using omni-directional antenna. While one could include two antennas in the system (an omni-directional antenna and a directional antenna) and then use the directional antenna for unicast information and the omni-directional antenna for broadcast, this is not always feasible.

Other currently known systems use a second system with different system parameters geared for broadcasting in order to coordinate the directional system. An example would be the use of a military "Link 16" radio with omni-directional antennas to share pointing parameters for a direction common data link (CDL) so as to instantiate a CDL link. However it is not always possible to include a second system purely for the purpose of broadcasting information to support a directional networking system.

SUMMARY

It has been recognized that an improved set of protocols to ensure efficient broadcast within a directional networking system is needed.

The current disclosure is directed to broadcasting information between nodes in a network when at least some of the nodes use directional antenna.

In one aspect, the present disclosure may provide a method of broadcasting information in a network comprising: providing a Mobile Ad-hoc Network (MANET) that includes nodes, wherein at least some of the nodes use directional antenna, starting a broadcast session by ordering the nodes in the MANET by address (particularly by arranging the nodes in ascending address order); determining a total number of the nodes; partitioning the nodes into a first group of nodes and a second group of nodes (particularly by placing lower address nodes in the first group and higher address nodes in the second group; and transmitting information from each node in the first group of nodes to a corresponding node in the second group of nodes; and reversing the transmission by transmitting information from each node in the second group of nodes to a corresponding node in the first group of nodes.

In another aspect, the present disclosure may provide a method of broadcasting information in a network comprising: providing a Mobile Ad-hoc Network (MANET) that includes nodes, wherein at least some of the nodes use directional antenna; ordering the nodes in the MANET; determining a total number of the nodes; partitioning the nodes into a first group of nodes and a second group of nodes; transmitting information from each node in the first group of nodes to a corresponding node in the second group of nodes; reversing direction of transmitting by transmitting information from each node in the second group of nodes to a corresponding node in the first group of nodes; verifying that all nodes in the first group of nodes have communicated with all nodes in the second group of nodes; permuting the first group of nodes and the second group of nodes if all nodes in the first group of nodes have not communicated with all nodes in the second group of nodes; repeating the steps of transmitting information from each node in the first group of nodes to a corresponding node in the second group of nodes; reversing the direction of transmitting and verifying that all nodes in the first group of nodes have communicated with all nodes in the second group of nodes until all nodes in the first group of nodes have communicated with all nodes in the second group of nodes; and verifying that there is only one node in each of the first group of nodes and each of the second group of nodes after the step of verifying that all the nodes in the first group of nodes have communicated with all of the nodes in the second group of nodes and then ending the broadcasting session.

BRIEF DESCRIPTION OF THE SEVERAL VIEWS OF THE DRAWINGS

A sample embodiment of the present disclosure is set forth in the following description, is shown in the drawings and is particularly and distinctly pointed out and set forth in the appended claims.

FIG. 3D is an exemplary schematic view of a directional-MANET frame structure in accordance with an aspect of the present disclosure, where the frame structure has ten nodes, eleven slots and five transmissions;

FIG. 5B is an exemplary graphical view of a transmission using a directional MANET frame structure and method in accordance with an aspect of the present disclosure, where the system includes fourteen nodes in total, frequency domain duplexing (FDD) is used, and wherein phantom nodes are introduced as needed;

Similar numbers refer to similar parts throughout the drawings.

DETAILED DESCRIPTION

A method for broadcasting information in a broadcast medium with directional coupling elements to that medium (e.g., antennas) is described herein.

In certain embodiments of the present disclosure, the broadcast medium coupling could be completed via electromagnetic antennas. In other embodiments the broadcast medium may be free space or air, or sound coupling to air or water. The methods described herein could be coupled with other methods as part of the "link" or media access control ("MAC") protocols, or networking protocols in a system, but could potentially be implemented at any layer of the ISO stack. While primarily intended for communications, the methods described herein could be used to control access to a medium for a number of purposes including sensing the medium, navigation and ranging, to deny the use of the medium by a given set of users, and the like.

Figure 1:
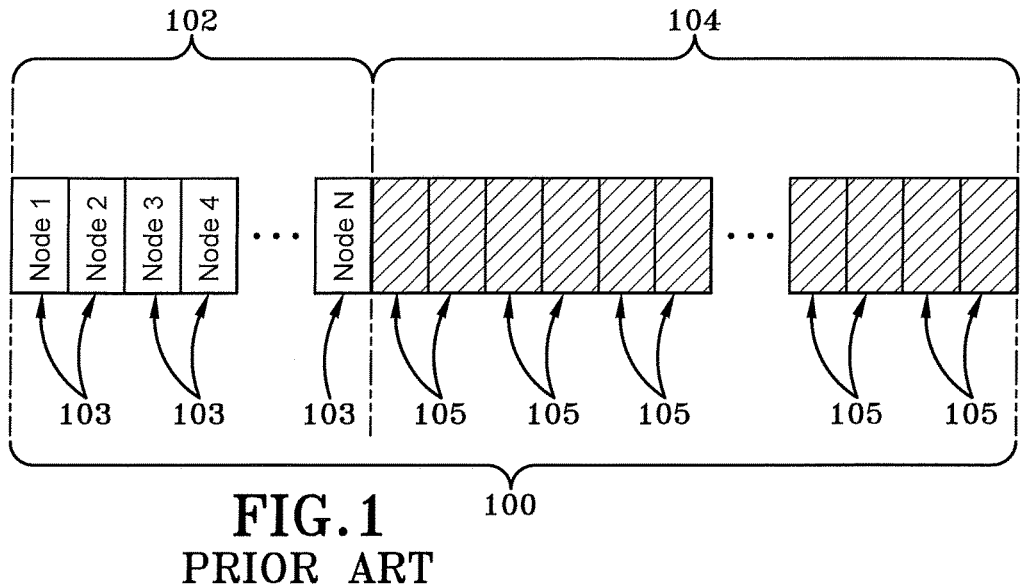
FIG. 1 is an exemplary schematic view of a PRIOR ART Omni-MANET frame structure showing an infinite number of nodes and slots.
Figure 1A:
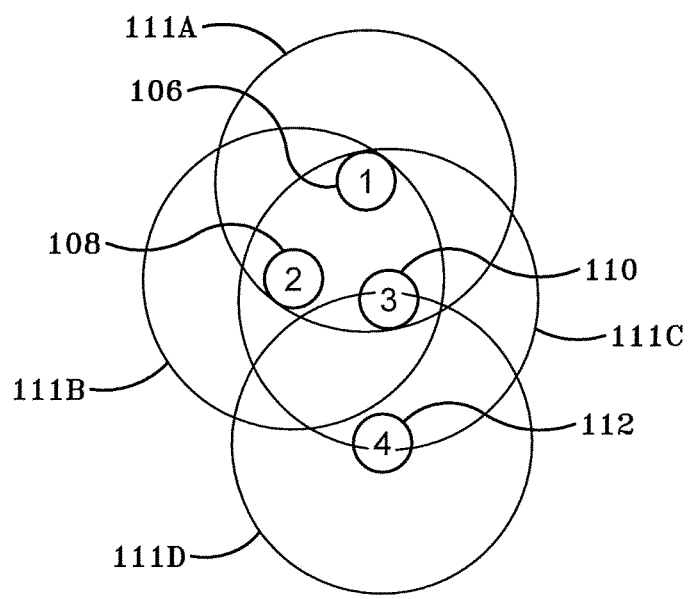
FIG. 1A is an exemplary MANET using a PRIOR ART Omni-MANET frame structure.
Figure 1B:
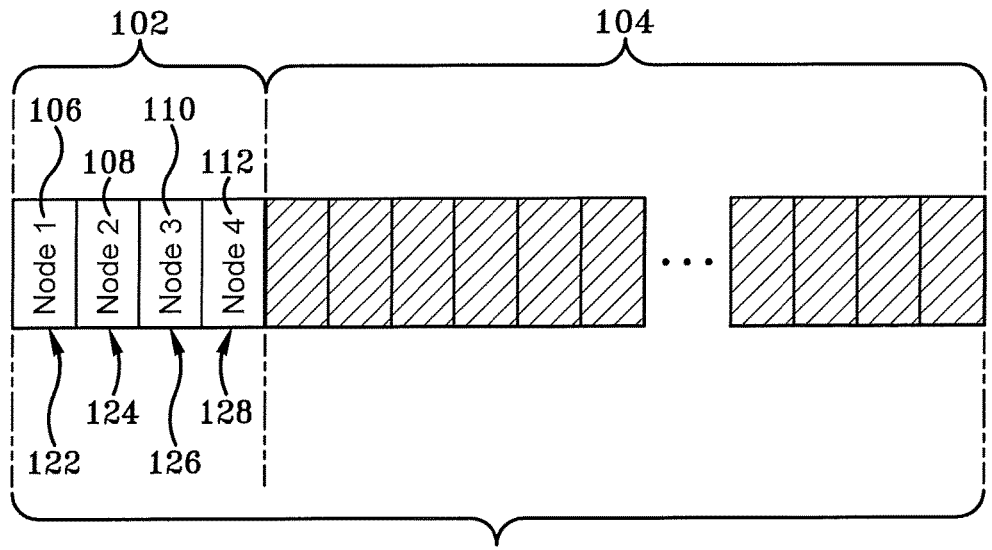
FIG. 1B is an exemplary schematic view of the PRIOR ART Omni-MANET frame structure having only four nodes and four slots.
Figure 1C:
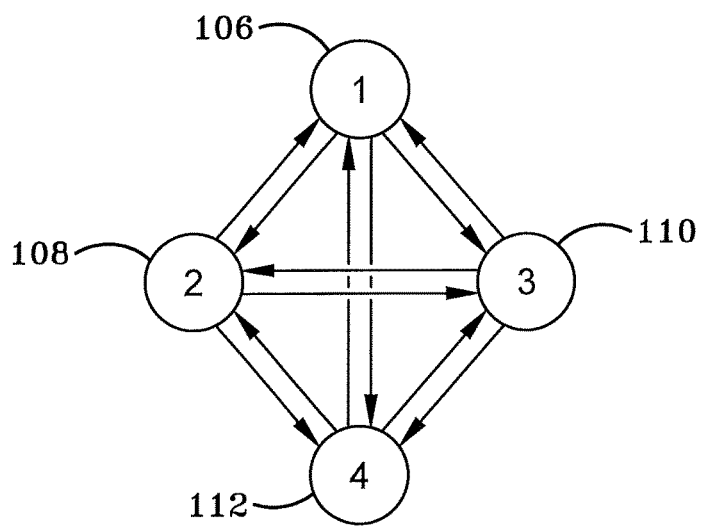
FIG. 1C is an exemplary graphic view of a broadcast using the PRIOR ART Omni-MANET frame structure of FIG. 1B.

FIGS. 1-1C show a PRIOR ART Omni MANET frame structure 100 and the way in which frame structure 100 is used. FIG. 1 illustrates an Omni-MANET frame structure 100 in which omni-directional antenna are utilized. An omni-directional antenna or omni-directional antenna is an antenna that is capable of transmitting or receiving transmissions (particularly radio transmissions) in all directions in one plane. The Omni MANET frame structure 100 comprises a broadcast control (BC) zone 102 and a demand access (DA) zone 104. Generally, a plurality of slots is allocated to the broadcast control (BC) zone 102. Each slot in zone 102 will be referred to herein as a BC slot 103. Each BC slot 103 in zone 102 is allocated to a specific node for broadcast traffic. Only that specific node can transmit during that slot and all other nodes will try and receive that transmission. As illustrated in FIG. 1, four BC slots 103 are shown, each having one specific node allocated therein, e.g., Node 1 indicated by reference number 106 is in a first BC slot 103; Node 2 indicated by reference number 108 is in a second BC slot 103, Node 3 indicated by reference number 110 is in a third BC slot 103, and Node 4 indicated by reference number 112 is in a fourth BC slot 103.

A separate zone 104 is allocated for "Demand Access". Slots in zone 104 are referred to herein as DA slots and are identified by the reference number 105. DA slots 105 in DA zone 104 are dynamically allocated as needed to each node. A single DA slot 105 in DA zone 104 might be used by multiple nodes to transmit if the transmissions do not interfere with each other.

There are many algorithms or programs that may be used for allocating slots for BC slots 103 and DA slots 105. An example program for allocating the DA slots 105 could be the well-known Unified Slot Assignment Protocol (USAP). An example method of allocating BC slots 103 is that each possible node in the network has a slot allocated based on node address. In some instances, allocating BC slots using ascending order from a start of a frame may be used. The frame structure 100 shown in FIG. 1 is a logical frame structure. In other embodiments, a "slot shuffling" program may be applied to pseudo-randomly reorder the slots prior to actual transmission.

Even though each node broadcasts information in its dedicated slot, this does not guarantee that all nodes hear all transmissions. As illustrated in FIG. 1A, first node 106 has a radio communications range 111A, second node 108 has a radio communications range 111B, third node 110 has a radio communications range 111C and fourth node 112 has a radio communications range 111D. The radio communications range 111D of fourth node 112 is such that third node 110 can hear transmissions from the fourth node 112. However, first node 106 and second node 108 cannot hear transmissions from fourth node 112. First, second, and third nodes 106, 108, 110 are all within communications range 111A, 111B, 111C of each other and can always hear each other's transmissions. It will be understood that all nodes that are within radio communications range of each other (such as first, second and third nodes 106, 108, 110 in FIG. 1A) hear each other's broadcast transmissions. This facilitates management of the MANET.

FIG. 1B, shows an Omni-MANET frame structure where there are four nodes in the network and each node is allocated a slot 103 in BC zone 102. Node 1, 106, is allocated a first BC slot 122, Node 2, 108, is allocated a second BC slot 124, Node 3, 110, is allocated a third BC slot 126, and Node 4, 112, is allocated a fourth BC slot 128. FIG. 1C shows that all four nodes 106, 108, 110, 112 communicate with each other simultaneously. These nodes 106-112 are in communications range of each other and all nodes hear all other nodes transmissions.

Figure 2:
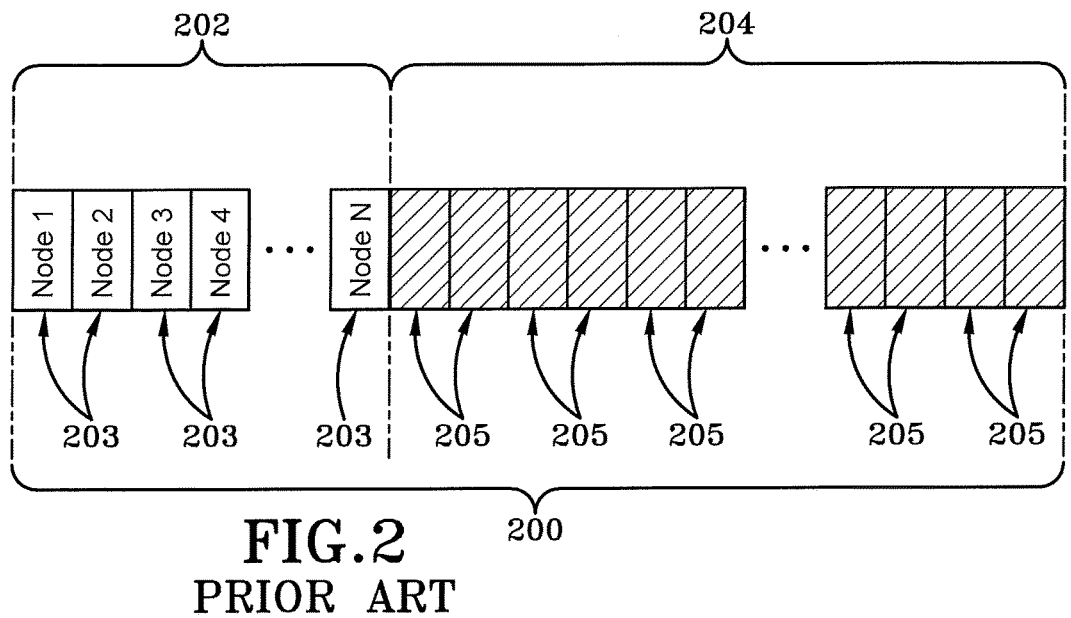
FIG. 2 is an exemplary schematic view of a PRIOR ART directional-MANET frame structure showing an infinite number of nodes and slots.

FIGS. 2-2C show a PRIOR ART MANET laydown that utilizes directional antenna. FIG. 2 illustrates a directional-MANET frame structure 200 where each node uses a directional antenna. A directional antenna is an antenna that focuses its transmission or reception in a particular direction. Frame structure 200 comprises a broadcast control (BC) zone 202 and a demand access (DA) zone 204. Directional-MANET frame structure 200 includes a plurality of BC slots 203 in BC zone 202 and a plurality of DA slots 205 in DA zone 204.

Figure 2A:
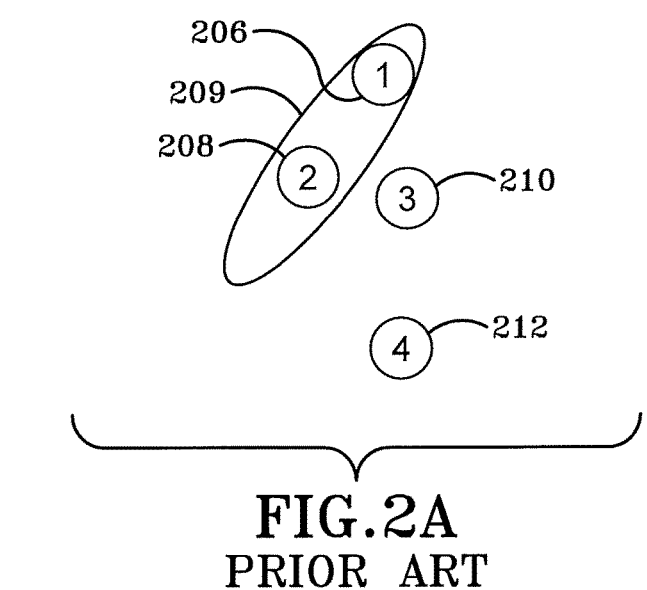
FIG. 2A is an exemplary MANET using a PRIOR ART directional-MANET frame structure.

Unlike the Omni-MANET 100 of FIGS. 1-1C, in the directional-MANET 200 broadcasting information from one node to all neighbor nodes that are in communications range is not always possible because of the directional nature of the antenna used. As illustrated in FIG. 2A, when first node 206 tries to broadcast to all nodes in communication range, first node 206 must focus its beam 209 at a specific node, namely second node 208, such that other nodes i.e., third node 210 and fourth node 212, cannot hear the first node's transmissions. This can cause a breakdown in the performance of the MANET protocols that depend on all neighbor nodes in communications range knowing, for example, the planned transmit schedule of its neighbors.

Figure 2B:
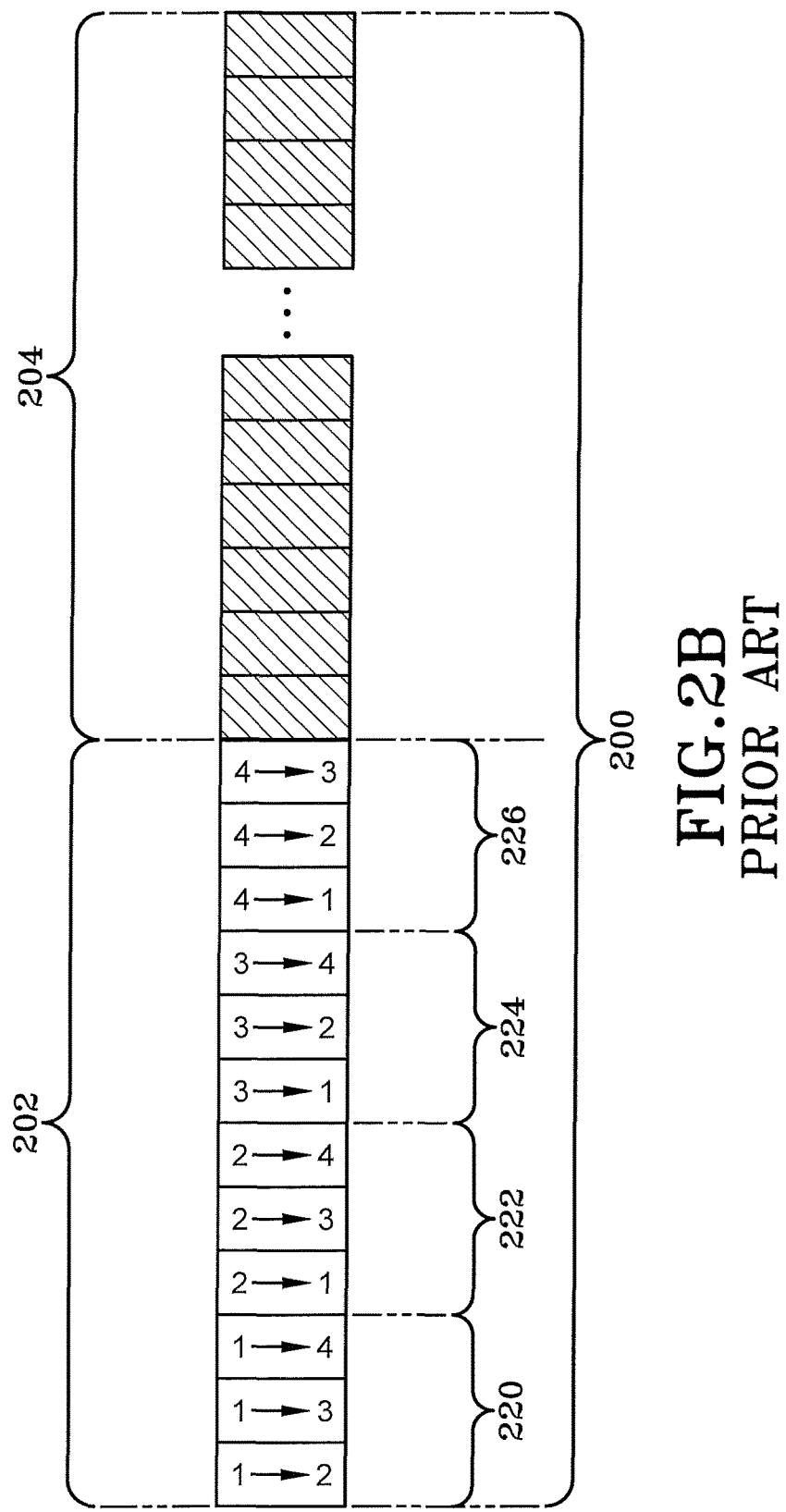
FIG. 2B is an exemplary schematic view of a PRIOR ART directional-MANET frame structure having four nodes and showing a directional broadcast for the four nodes that requires twelve slots.

One possible solutions to this problem is to allocate more transmit slots for each node to rebroadcast the same information for each possible destination node. So, for example, if there are four nodes 206, 208, 210, 212, each node may be assigned three slots for BC traffic to ensure the traffic reaches all possible neighbor nodes. With an omni-MANET (FIG. 1B), only four broadcast slots are required for all nodes to hear broadcasts from all possible other nodes. With the same approach, using the directional-MANET of FIG. 2B and replicating the information transmitted to each node, a total of twelve (four×three) slots are required for all broadcasts. This is shown in FIG. 2B, three slots 220 in BC zone 202 in the directional-MANET frame structure 200 are required for the broadcasts of "node 1→node 2," "node 1→node 3," and "node 1→node 4," respectively. Three slots 222 in BC zone 202 are required for the broadcasts of "node 2→node 1," "node 2→node 3," and "node 2→node 4," respectively. Three slots 224 in BC zone 202 are required for the broadcasts of "node 3→node 1," "node 3→node 2," and "node 3→node 4," respectively. Finally, three slots 226 in BC zone 202 are required for the broadcasts of "node 4→node 1," "node 4→node 2," and "node 4→node 3," respectively. Thus, the number of slots required to broadcast all information to all neighbor nodes is three times greater than when using omni-MANET 100 (FIG. 1B). In directional-MANET 200, not only are more slots required to broadcast to all neighbor nodes than in omni-MANET 100 but the time required to make transmit the same information to all neighbor nodes is also greater. Thus, using a directional-MANET system is very inefficient. The inefficiency is even greater in larger MANET systems.

Figure 3A:
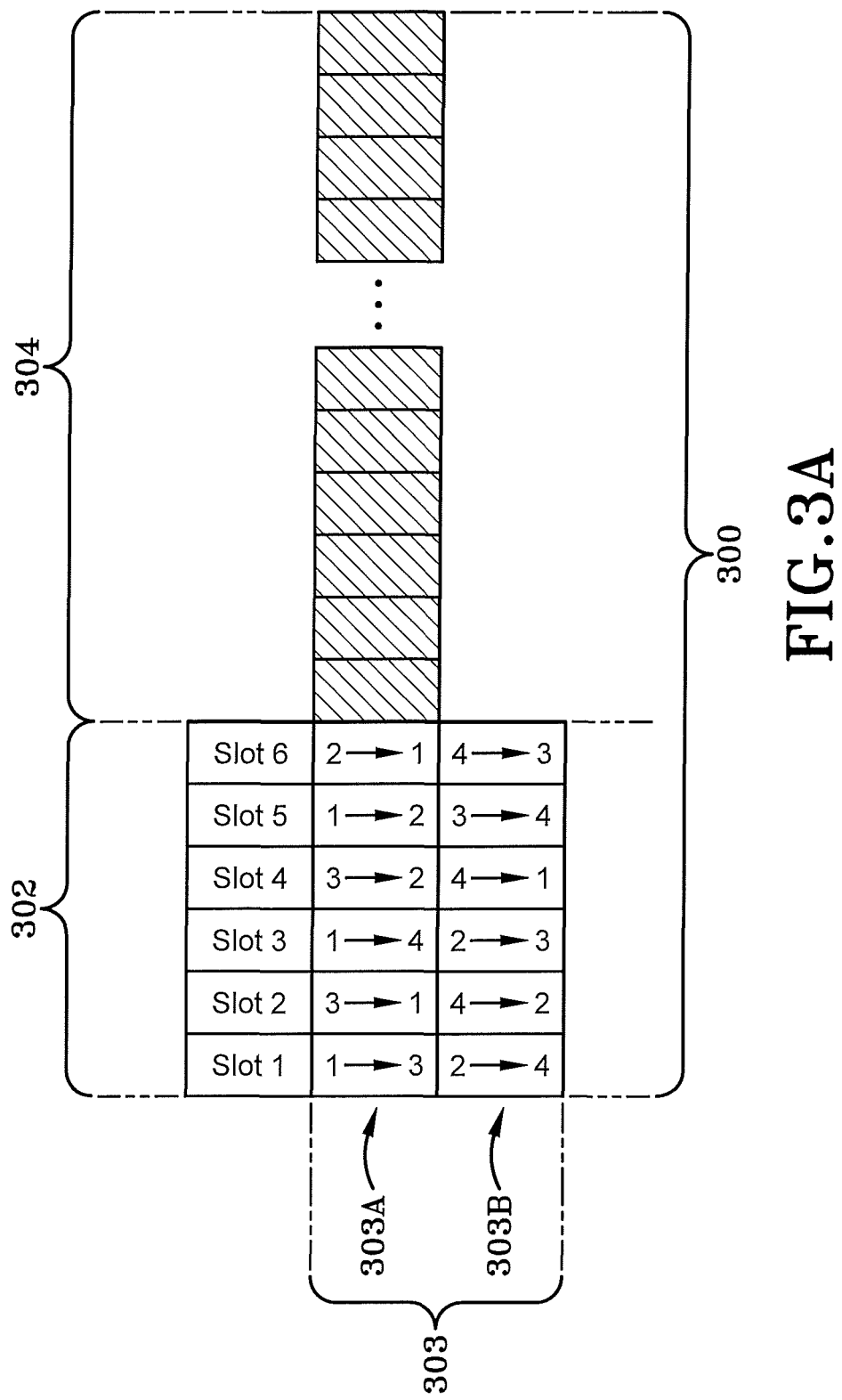
FIG. 3A is an exemplary schematic view of a broadcast using a directional-MANET frame structure and method in accordance with an aspect of the present disclosure; where the frame structure is illustrated as having four nodes, six slots and two transmissions.

FIGS. 3A-6C show a directional-MANET system in accordance with an aspect of the present disclosure. FIGS. 3A and 3B show an exemplary method of broadcasting using a directional-MANET in accordance with an aspect of the present disclosure. The provided directional-MANET of FIGS. 3A and 3B is illustrated as a four node network, assuming that all four nodes are within communications range and must therefore hear each other's broadcasts. The method in accordance with the present disclosure takes advantage of the fact that not all nodes can hear each other when directional antennas are used to allow multiple transmissions to occur at once. For cases where nodes have overlapping coverage and would interfere, the network would depend on other techniques such as spread spectrum or multi-user detection to resolve connection. Scheduling techniques could also be applied.

FIG. 3A shows a directional-MANET frame structure 300 comprising a broadcasting control (BC) zone 302 and a demand access (DA) zone 304. As illustrated, BC zone 302 includes six slots and MANET 300 includes four nodes.

In one embodiment of a method in accordance with an aspect of the present disclosure, the four nodes in the MANET 300 are ordered and form a first group. Any suitable manner of ordering the nodes in the network may be utilized. For example, the nodes may be ordered in the same manner as indicated with respect to the omni-MANET 100. There are many algorithms or programs that may be used for allocating slots for BC zone 302 and DA zone 304. An example program for allocating the DA slots in DA zone 304 could be according to the Unified Slot Assignment Protocol (USAP). An example method of allocating slots in BC zone 302 may include that each of the four nodes in the network has a slot allocated based on the node address. In particular, the BC slots may be allocated using ascending order from a start of a frame. In other embodiments, a "slot shuffling" program may be applied to pseudo-randomly reorder the slots prior to actual transmission. In directional-MANET 300, the four nodes may be ordered as Node 1, Node 2, Node 3, and Node 4, based on the nodes addresses in ascending order and each of the Nodes 1-4 are allocated into BC slots based on their addresses.

In a next step according to an embodiment of the method of the present disclosure, the ordered four nodes are partitioned into a lower group 306 and an upper group 308. The partition is based on the addresses of the nodes. So, Node 1 and Node 2 are partitioned into lower group 306 and Node 3 and Node 4 are partitioned into upper group 308.

FIG. 3A shows a transmission (traffic) schedule 303 identifying a set of directional transmissions to accomplish directional broadcast in accordance with the method of the present disclosure. FIG. 3A shows a first transmission 303A in which a first round of transmissions occurs and a second transmission 303B in which a second round of transmissions occur. The set of transmissions are repeated in the BC zone 302 of each frame.

Figure 3B:
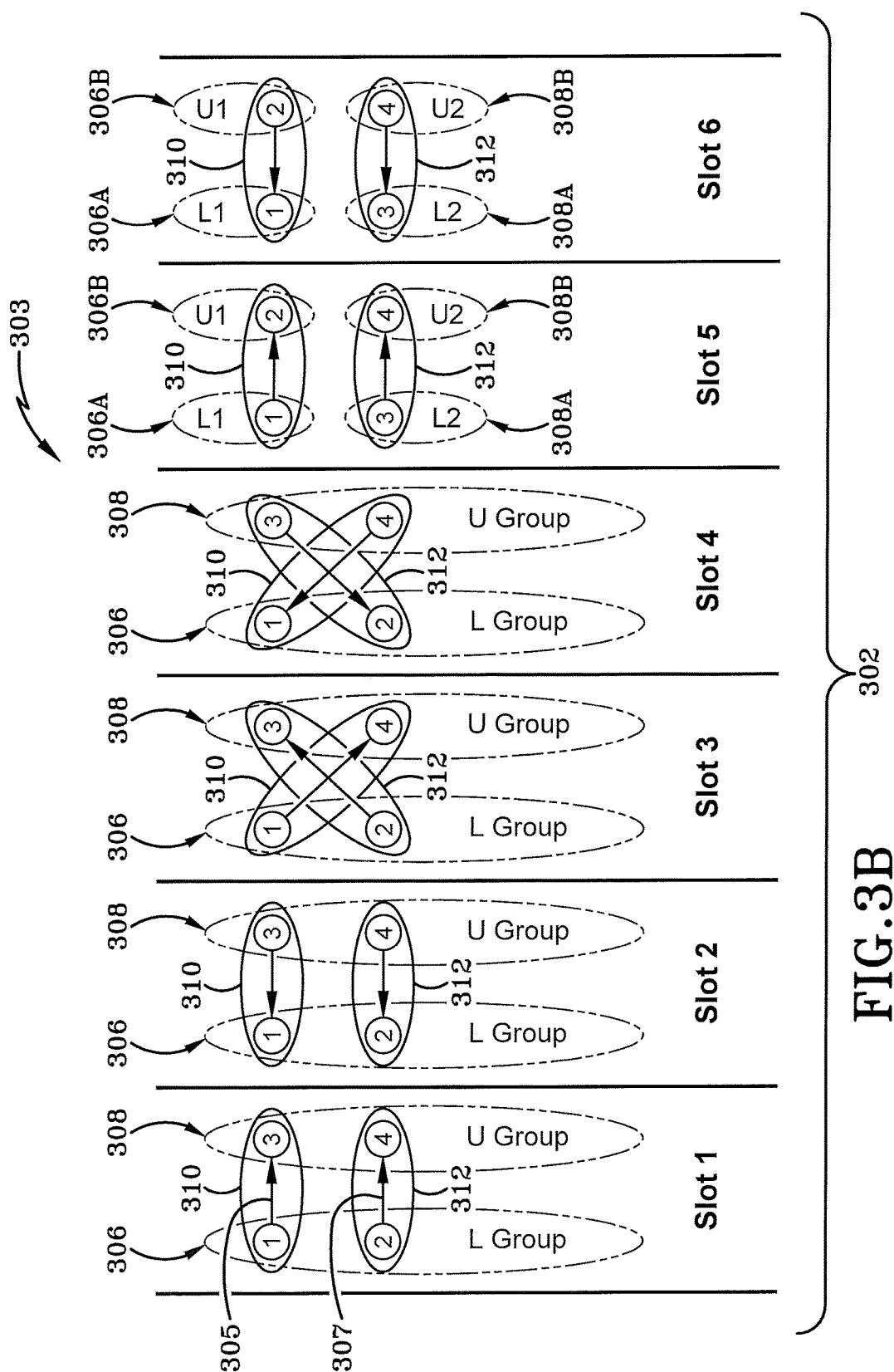
FIG. 3B is an exemplary graphic view of the broadcast between the four nodes in the directional-MANET frame structure shown in FIG. 3A, where the transmissions are made in accordance with a method of the present disclosure.

FIGS. 3A and 3B show that the node with the lowest address in lower group 306 (Node 1) transmits its broadcast information to the node with the lowest address in the upper group 308 (Node 3). As depicted in FIG. 3B, this transmission activity is shown by arrow 305. An oval 310 represents the orientation of node 1's directional antenna. In certain embodiments, node 3 would point its directional antenna towards node 1 as appropriate. As shown in the transmission schedule 303 of FIG. 3A, the first transmission is notated as "node 1→node 3" in the first transmission 303A under Slot 1. Additionally, in the same Slot 1, the node with the next lowest address in lower group 306 (Node 2) simultaneously transmits its broadcast information to the node with the next lowest address in the upper group 308 (Node 4). As depicted in FIG. 3B this simultaneous transmission activity is shown by arrow 307 and the second transmission 303B is noted as "node 2→node 4". Additionally, a second oval 312 represents the orientation of node 2's directional antenna. In certain embodiments, node 4 would point its directional antenna towards node 2 as appropriate. At this point, node 3 has received node 1's broadcast information and node 4 has received node 2's broadcast information.

Then the transmission is reversed. As shown in Slot 2 of FIG. 3B, even though the same allocations are used, the directions of transmissions are reversed so that the nodes in the upper group 308 transmit to the nodes in the lower group. In other words, node 3 and node 4 now transmit to node 1 and node 2, respectively. These transmissions are represented as "node 3→node 1" and "node 4→node 2" under Slot 2 in FIGS. 3A and 3B. After this transmission, node 1 has received node 3's broadcast information and node 2 has received node 4's broadcast information.

At this point in the method, node 1 has its own broadcast information as well as node 3's broadcast information and vice versa. Similarly, node 2 has its own broadcast information as well as node 4's broadcast information and vice versa. However, node 1 does not have node 4's broadcast information and vice versa and node 2 does not have node 3's broadcast information and vice versa.

At this point, all of the nodes in the lower group 306 and all of the nodes in the upper group have not yet communicated with each other. In Slot 3 of FIGS. 3A and 3B, each node talks to the next ascending address in the other subgroup. For convenience, it may be considered that each group is independently renumbered and given a different base address. So, in the case of node 1, this node would now talk to node (3+1) or node 4. This may be thought of as having base value of 2, and being "node 2: in the group. The node value of 1 would be incremented and then the base value added. So node (1+1+2) or node 4. Node 2 would talk to (2+1) node 2 or 1 plus the base value of 2, or node 3. So, as shown in Slot 3 in FIGS. 3A and 3B, the lowest node in the lower group 306, which is node 1, now talks to the highest node in the upper group 308, which is node 4. Similarly, the highest node in the lower group 306, which is node 2, now talks to the lowest node in the upper group 308 which is node 3. These transmissions are represented as "node 1→node 4 and "node 2→node 3" under Slot 3 of FIGS. 3A and 3B.

In Slot 4, the same allocations are used, however, the directions of transmission is reversed such that node 4 and node 3 now transmit to node 1 and node 2 respectively. These transmissions are represented as "node 4→node 1" and "node 3→node 2" under Slot 4 of FIGS. 3A and 3B. At the end of Slot 4, all nodes in the upper group 308 have received broadcast information from all nodes in the lower group 306, and vice versa. However, not all nodes within the lower group 306 have heard from the other nodes in the lower group 306 and not all nodes within the upper group 308 have heard from the other nodes in the upper group 308. Thus, the same distribution process has to be repeated to create subgroups within the lower group 306 and within the upper group 308. So, lower group 306 is divided into two new subgroups: a first lower group 306A and a first upper group 306B, with the lower addressed nodes going into the first lower group 306A and the higher addressed nodes going into the first upper group 306B. As shown in FIG. 3B, node 1 goes into the first lower group 306A and node 2 goes into the first upper group 306B. Similarly, the original upper group 308 is divided into two new subgroups: a second lower group 308A and a second upper group 308B. Node 3 goes into the second lower group 308A and node 4 goes into the second upper group 308B. Then, the same program is applied as before with these subgroups simultaneously. First lower group 306A talks to first upper group 306B and second lower group 308A talks to second upper group 308B. Since there is only one node in each group, only one slot is required to do this transmission. Thus, schematically, these transmissions may be represented as "node 1→node 2" and "node 3→node 4" under Slot 5 of FIGS. 3A and 3B. In Slot 6, the direction of transmission is reversed but the same participants communicate with each other. Thus, schematically, these transmissions may be represented as "node 2→node 1" and "node 4→node 3" under Slot 6 of FIGS. 3A and 3B. At this point, all nodes in the network possess the broadcast information of all other nodes in the network and the transmission is completed.

It should be noted that unlike the PRIOR ART directional-MANET 200, the directional-MANET 300 of the present disclosure requires only six slots to complete the transmission whereas MANET 200 required twelve slots. Thus the number of slots and the time taken to broadcast information to all nodes in the network is substantially reduced.

In another embodiment (not illustrated herein) if bidirectional communication method is available (i.e., frequency domain duplexing, FDD), then Slot 1 and Slot 2 may be combined into a single slot and the same set of transmission information exchanges as illustrated in FIGS. 3A and 3B may occur. So, for example, the first transmission 303A under Slot 1 "node 1→node 3" and the first transmission 303A under Slot 2 "node 3→node 1", may be replaced by a single slot in which the transmissions "node 1←→node 3" will occur as the nodes simultaneously broadcast their information to each other. Similarly, in the second transmission 303B, nodes 2 and 4 will broadcast their information simultaneously to each other. Similarly, Slot 3 and Slot 4 may be combined into a single slot and the transmissions in the combined slot may occur simultaneously, i.e., node 1←→node 4 and node 2←→node 3. Finally, Slot 5 and Slot 6 may be combined into a single slot and the transmissions node 1←→node 2 and node 3←→node 4 will occur simultaneously. When FDD is used, the lowest addressed node may use the lowest frequency for transmission in the frequency pair used for duplexing transmission. However, other alternative methods for assigning the frequencies in FDD are also possible. Thus, if the method in accordance with the present disclosure is used and FDD is utilized, only three slots will be required. The PRIOR ART Omni-MANET 100 requires four slots (one for each node as shown in FIG. 1C) to achieve the same broadcasting function. Thus, the directional broadcast program described herein is more efficient than the PRIOR ART Omni-MANET system when FDD is used.

Figure 3C:
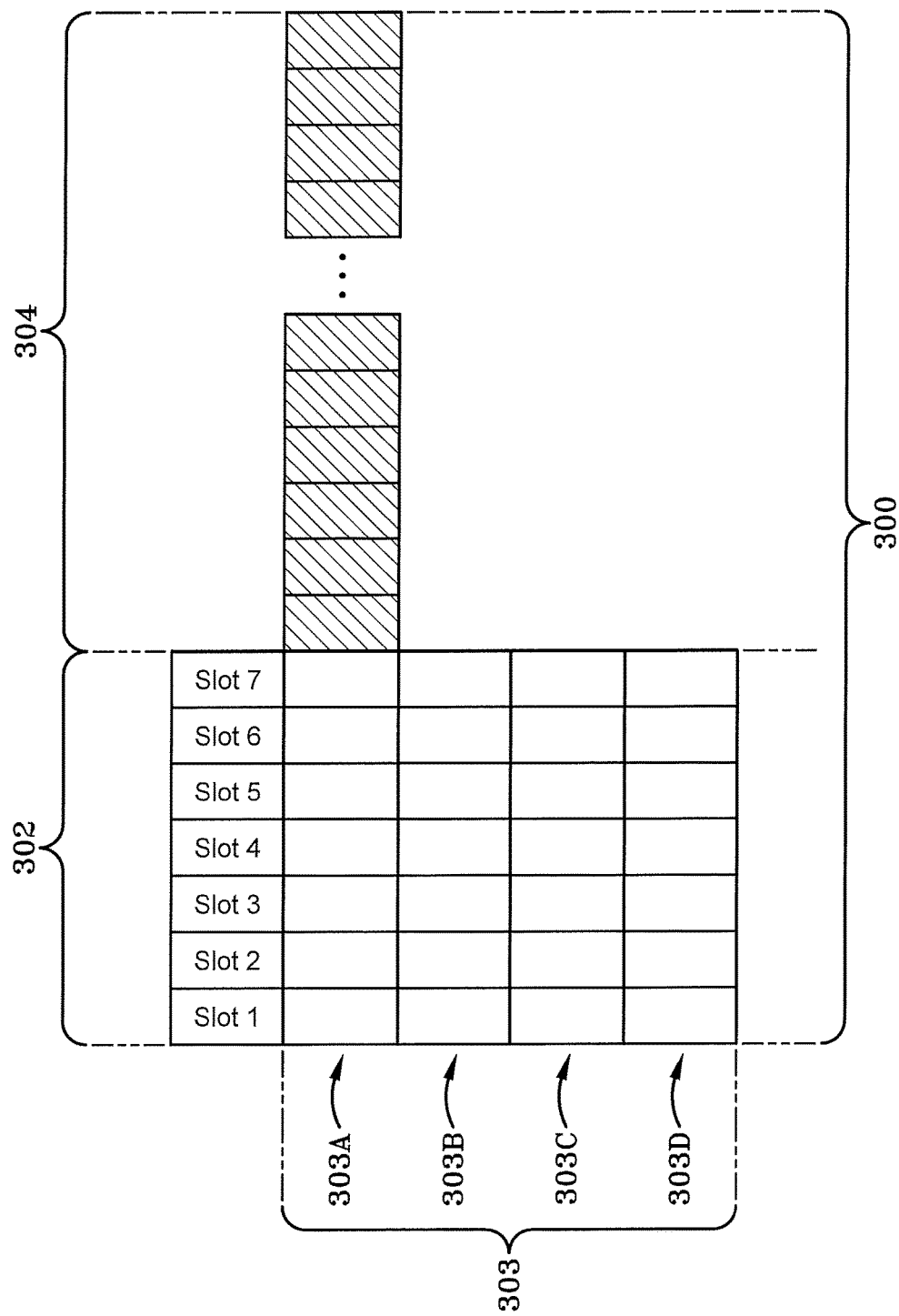
FIG. 3C is an exemplary schematic view of a directional-MANET frame structure in accordance with an aspect of the present disclosure, where the frame structure includes eight nodes, seven slots and four transmissions.

In another embodiment, as shown in FIG. 3C, there may be eight nodes in the network and seven slots and a transmission schedule 303. The transmission schedule 303 identifies a set of directional transmissions to accomplish directional broadcasting for all nodes within communications range. Because there will be four nodes in the lower group and four nodes in the upper group, in each slot, the transmission schedule 303 require four transmissions, namely, a first transmission 303A, a second transmission 303B, a third transmission 303C, and a fourth transmission 303D. So, for example if the eight nodes comprise Node 1, Node 2, Node 3, Node 4, Node 5, Node 6, Node 7 and Node 8, the step of partitioning the nodes would divide the nodes into a lower group (Nodes 1, 2, 3 and 4) and an upper group (Nodes 5, 6, 7 and 8). Node 1 will transmit to Node 5 in first transmission 303A; Node 2 will transmit to node 6 in second transmission 303B, node 3 will transmit to node 7 in third transmission 303C and node 4 will transmit to node 8 in fourth transmission 303D. The transmission schedule 303 may be repeated in a number of slots in the BC zone 302 of frame structure 300.

In another embodiment, as shown in FIG. 3D, if there are ten nodes in the network, then the transmission schedule 303 may comprise a first transmission 303A, a second transmission 303B, a third transmission 303C, a fourth transmission 303D, and a fifth transmission 303E. The fifth transmission 303E may be used for phantom nodes which will be disclosed in details later in this disclosure.

Figure 4:
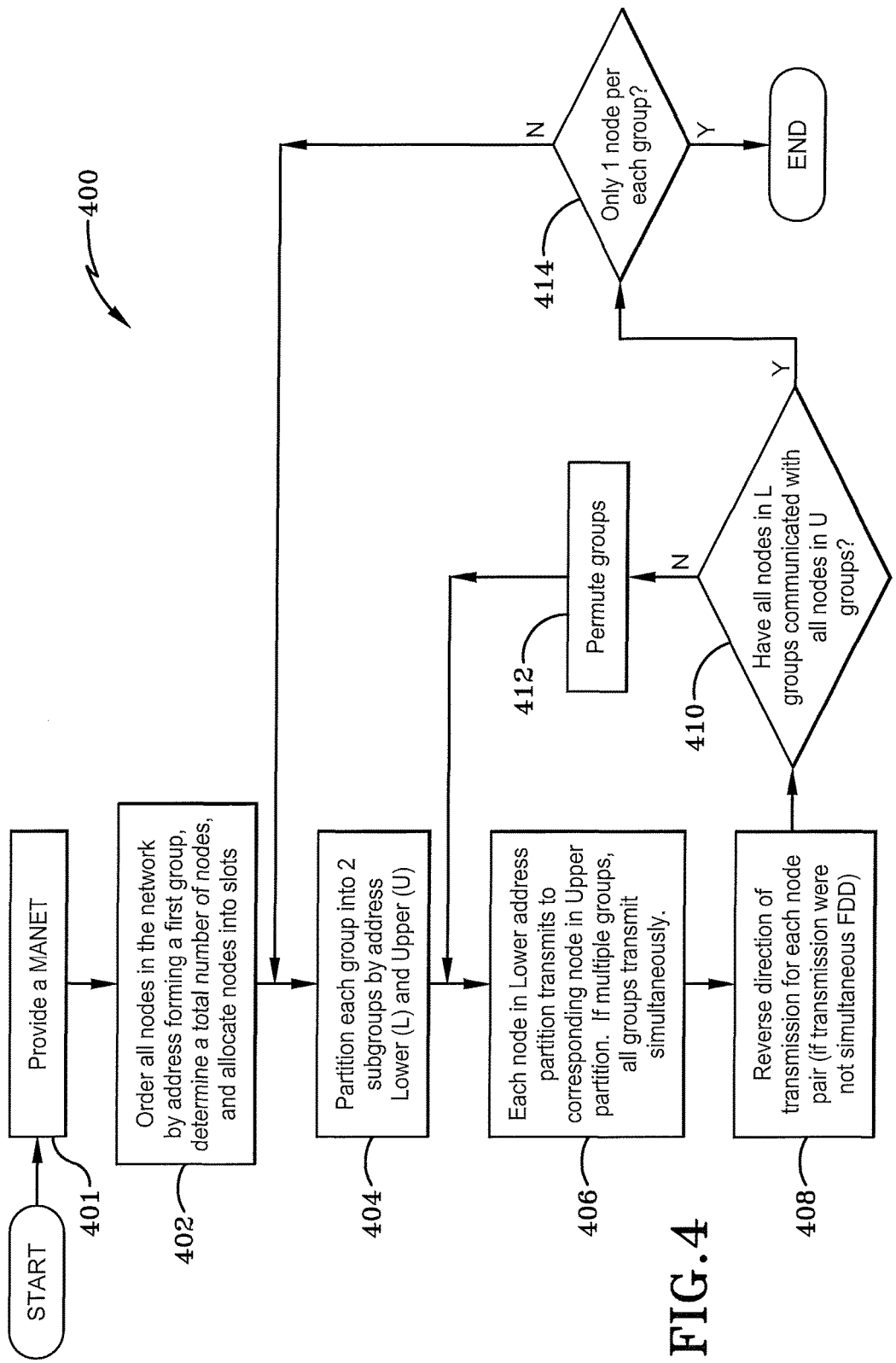
FIG. 4 is a flow chart showing a method of using a directional-MANET frame structure in accordance with an aspect of the present disclosure.

FIG. 4 illustrates the method 400 to implement the directional broadcasting algorithm or program in accordance with the present disclosure. The method 400 comprises the following steps:

(1) step 401—providing a MANET that includes nodes, slots and uses directional antenna;

(2) step 402—ordering all nodes in the network by address forming a first group and allocating a total number of slots in the network;

(3) step 404—partitioning each group into two subgroups by address; i.e. forming a Lower subgroup and an Upper subgroup;

(4) step 406—each node in the Lower subgroup partition transmits to a corresponding node in the Upper subgroup partition (If there are multiple groups they may transmit simultaneously);

(5) step 408—reversing the direction of transmission for each node pair (if the transmissions were not simultaneous frequency domain duplexing (FDD))—i.e. each node in the Upper subgroup partition transmits to the corresponding node in the Lower subgroup partition;

(6) step 410—verify that all nodes in the Lower subgroup partition communicated with all nodes in the Upper subgroup partition;

(7) step 412—if the answer to the verification of step 410 is "NO" then all the groups are permuted. This ensures that the nodes in the lower group will communicate with different nodes in the upper group than was the case in the previous round of transmissions. Once one or both of the lower and upper groups are permuted, the steps 406 to 410 are repeated; and (8) step 414—if the answer to the verification of step 410 is "YES" then verification is made as to whether there is only 1 node per group. If the answer is "NO" then steps 404 to 414 are repeated. If the answer is "YES" then the transmission process ends.

The method 400 will be described in greater detail hereafter. Step 401 requires providing a directional MANET that includes a certain number of nodes and slots and uses at least some directional antenna. This step may be seen in FIG. 3A as providing a frame structure for directional MANET 300 with four nodes and six slots and the nodes use directional antenna.

In step 402 all possible nodes that may participate in the network are determined and then those determined nodes are placed in an order, such as by using their addresses. In some embodiments, the maximum number of nodes in the network (such as network 300) may be dynamically determined. As long as this maximum number of nodes is determined the same way in all nodes of the network and the addresses of potentially participating nodes are known, method 400 may be implemented. It should be noted that any method of allocating addresses for all nodes may be used. Each node in the network requires a unique address or if there is another unique parameter associated with each node, then that unique parameter may be used instead of an address provided that the values are known to all participants and the parameter allows the nodes to be uniquely ordered. The term "address" as used herein should be understood to include ordering the node participants using any unique parameters. Referring back to FIGS. 3A and 3B, this step may be seen where the nodes are ordered as by ascending address as node 1, node 2, node 3 and node 4.

Once the number and the order of the participating nodes is established, the number of slots required to implement the directional broadcast method may be determined and allocated in any suitable manner. (Referring back to FIGS. 3A and 3B, since four nodes are participating, six slots are allocated.) In other embodiments, the maximum number of addresses may be pre-computed and the appropriate number of slots to support that number of addresses may be allocated. For example, if there are 16 nodes, then 15 slots are required when operating in FDD. In other embodiments, the allocation could be static rather than dynamic. In static allocation, every frame is fixed or possibly distributed over a subset of frames if a "superframe" structure is used where only some frames include a broadcast zone on a repeating schedule or each frame in the superframe only contains a portion of the total BC zone.

As shown at step 404 in FIG. 4, the method 400 then partitions the nodes in half based on the addresses with all the lower addresses going to one group (i.e., a lower group) and the upper addresses going to another group (i.e., a upper group). Referring back to FIGS. 3A and 3B, the lower addressed nodes, node 1 and node 2, are placed in the lower group 306; and the higher addressed nodes, nodes 3 and node 4 are placed in the upper group 308.

In one embodiment, the total number of nodes is an even number and the two groups (lower and upper) are of equal size. In another example, if the total number of nodes is an odd number then the two groups are not of the same size. When there is odd number of nodes in the network then the extra node is assigned to the lower group and a "phantom" node is created in the upper group so that the two groups are of the same size. The phantom node is paired with the extra node in the lower group. (Other solutions to the different numbers of nodes in the two groups may be applied such as assigning the phantom node to the lower group, for instance to the lowest address in the lower group; or by assigning the phantom node to any address in either of the upper or lower group.) All that is required is that the phantom nodes are consistently placed the same way by all nodes in the group. For example, if there are nine nodes, then the highest node in the lower group will be node 5. Since the total number of nodes is odd, node 5 would not have anyone to broadcast its information to so a phantom node is created and assigned to the highest address in the upper group so that node 5 can transmit its information to the phantom node. Since the phantom node does not actually exist, node 5 need not transmit to or receive from the phantom node. Node 5 can do some other activity as long as that activity does not interfere with broadcasts from the other nodes. In other words, the phantom node is purely for bookkeeping. In certain embodiments, if there were only three nodes then a phantom node (node 4) would be created and the same transmission pattern as illustrated in FIGS. 3A and 3B would be used. When node 4 is scheduled to transmit, no transmission would occur, and the intended receiver (such as node 2) would not need to listen for a transmission from node 4. If there were other nodes in the lower group, additional transmissions would be scheduled in Slot 1 such that all nodes in the lower group would transmit if there is a corresponding node in the upper group to receive. In Slot 2, the same allocations would be used but this time with the direction of transmission reversed.

As depicted at step 406 in FIG. 4, once two groups (the lower group and the upper group) are formed, the lowest address in the lower group first transmits its information to the lowest address in the upper group. Then, the second lowest address in the lower group transmits its information to the second lowest address in the upper group. (Referring to FIG. 3A by way of example, node 1 transmits to node 3 and node 2 transmits to node 4.) This same process continues until the last address in the lowest group transmits its information to the last address in the upper group. In another instances, all the nodes in the lower group may transmit their information simultaneously to the corresponding nodes in the upper group. This transmission would occupy a first slot in the network (such as Slot 1 in FIG. 3A).

As depicted at step 408 in FIG. 4, the node pairs from step 406 are maintained, but the direction of transmission is reversed so that the nodes in the upper group now transmit information to the lower group. This requires a second slot in the network. So, for example, in FIGS. 3A and 3B, node 3 transmits to node 1 and node 4 transmits to node 2 in Slot 2. If the nodes are capable of full duplex communications (i.e., frequency domain duplexing, FDD), then a single slot is sufficient to accomplish both steps. Thus, step 408 may be combined with step 406. Using FDD to combine step 408 with step 406 is a preferred implementation of the method, but it is not required to practice the method to accomplish the same purpose.

As shown at step 410 in FIG. 4, the next step in method 400 checks or verifies whether all nodes in the lower group have exchanged their data with all nodes in the upper group. If all of the nodes in the lower group have not exchanged their data with all of the nodes in the upper group, then the method continues to step 412 which requires permutation of the lower and upper groups relative to each other. So, once the lowest nodes in the two groups have exchanged information then the lowest node in the lower group will transmit to the next lowest node (i.e., the second lowest) in the upper group. The second lowest address in the lower group will transmit to the third lowest node in the upper group and so on. This would be a "permutation" or the original set of transmitters. In certain embodiments, the target node in the upper group is computed using modulo arithmetic, such that the highest node in the lower group transmits to the lowest mode in the upper group on the first permutation and vice versa in step 412. The number of permutations may be determined by ceil(M/2), where M is the largest number of nodes in any set for that round. Particularly, the number may include a phantom node if necessary. For instance, when there are seven nodes, then the largest number of nodes in the set is 8. Thus, the required number of permutations is 4.

Alternatively, any methods for permuting the groups may be used so that all nodes in the lower group communicate exactly once with all of the nodes in the upper group.

After the groups are permuted, the method 400 proceeds back to steps 406 and 408 where the nodes in the lower group transmit information to the nodes in the upper group and vice versa. So, for example, in FIGS. 3A and 3B, node 1 transmits to node 4 and node 2 transmits to node 3; and then the transmission is reversed and node 4 transmits to node 1 and node 3 transmits to node 2. As described previously, two slots may be taken for each pair of nodes to exchange their information. If FDD is used, it may only require only one slot to accomplish the same. One or more phantom nodes may exist as the highest node in the upper group or the lowest node in the lower group for bookkeeping purposes. When phantom nodes exist, nodes that must transmit to the phantom node need not actually transmit/receive to the phantom node during those slots but may conduct some other activity as long as that activity does not interfere with the other broadcasts. This is also true for node addresses that are allocated but it is known that the nodes are not currently available in the network to transmit or receive broadcasts. Steps 406, 408. 410, 412 will continue until all of the nodes in the lower group have transmitted to all of the nodes in the upper group and vice versa. So if there were 2^n nodes (n>2) in all 2^n slots will have been consumed (2^(n−1) if FDD). In certain embodiments, once introduced, the phantom nodes (and their addresses) are maintained through all future iterations until all iterations are complete. At this point, since all of the nodes in the lower group have transmitted all their information to all of the nodes in the upper group, the answer for the question in step 410 will be "Yes." Then, the method 400 proceeds to step 414 as shown in FIG. 4.

At step 414 in FIG. 4, the method 400 asks whether there is only one node remaining in each group. If either of the groups includes more than one node, then each of the groups must be broken into subgroups, and the method then reverts to step 404 and the process is repeated. In the second iteration (partition) of step 404, the lower group may be divided into two subgroups: a first lower subgroup (L1) and a first upper subgroup (U1). Similarly, the upper group is divided into two subgroups: a second lower subgroup (L2) and a second upper subgroup (U2). This is illustrated in FIG. 3B in Slot 5 where the lower group 306 (which includes nodes 1 and 2) become first lower subgroup 306A (node 1) and first upper subgroup 306B (node 2); and upper group 308 (which includes nodes 3 and 4) become second lower subgroup 308A (node 3) and second upper subgroup 308B (node 4). Then, the same method may be applied to each of these subgroups so that all of the nodes in the first lower subgroup (L1) transmit to all of the nodes in the first upper subgroup (U1) and vice versa. Similarly, all nodes in the second lower subgroup (L2) would transmit to all nodes in the second upper subgroup (U2) and vice versa. Referring again to FIG. 3B, node 1 transmits to node 2 and vice versa; and node 3 transmits to node 4 and vice versa.

In certain embodiments, steps 406 to 412 may include multiple upper and lower groups in an iteration and the steps apply simultaneously to all pairs of upper and lower groups. In the first iteration there is one pair of groups; in the second iteration two pairs, in the third iteration four pairs, and so on. Since there are less nodes in each subgroup as the iterations continue, it will take less slots to complete the transmissions required at each iteration. In certain embodiments, if there were $2^n$ nodes originally, then this set of transmissions would take $2^(n-1)$ slots on the second iteration or $2^(n-2)$ slots for FDD. If there is more than one node in each of the subgroups, the process will be repeated with each subgroup again being broken into lower and upper subgroups. So, where there were two groups in the first iteration and four groups in the second iteration, there would be eight groups in the third iteration, and so on. Each time the number of slots required for exchanges would decrease by roughly a factor of two until only one node exists in each subgroup. After the nodes in the upper and lower subgroups at the lowest tier (e.g. with one node each) exchange broadcasts, as shown at step 414, the method would terminate with all nodes have broadcasted to all other nodes in the network.

Figure 5:
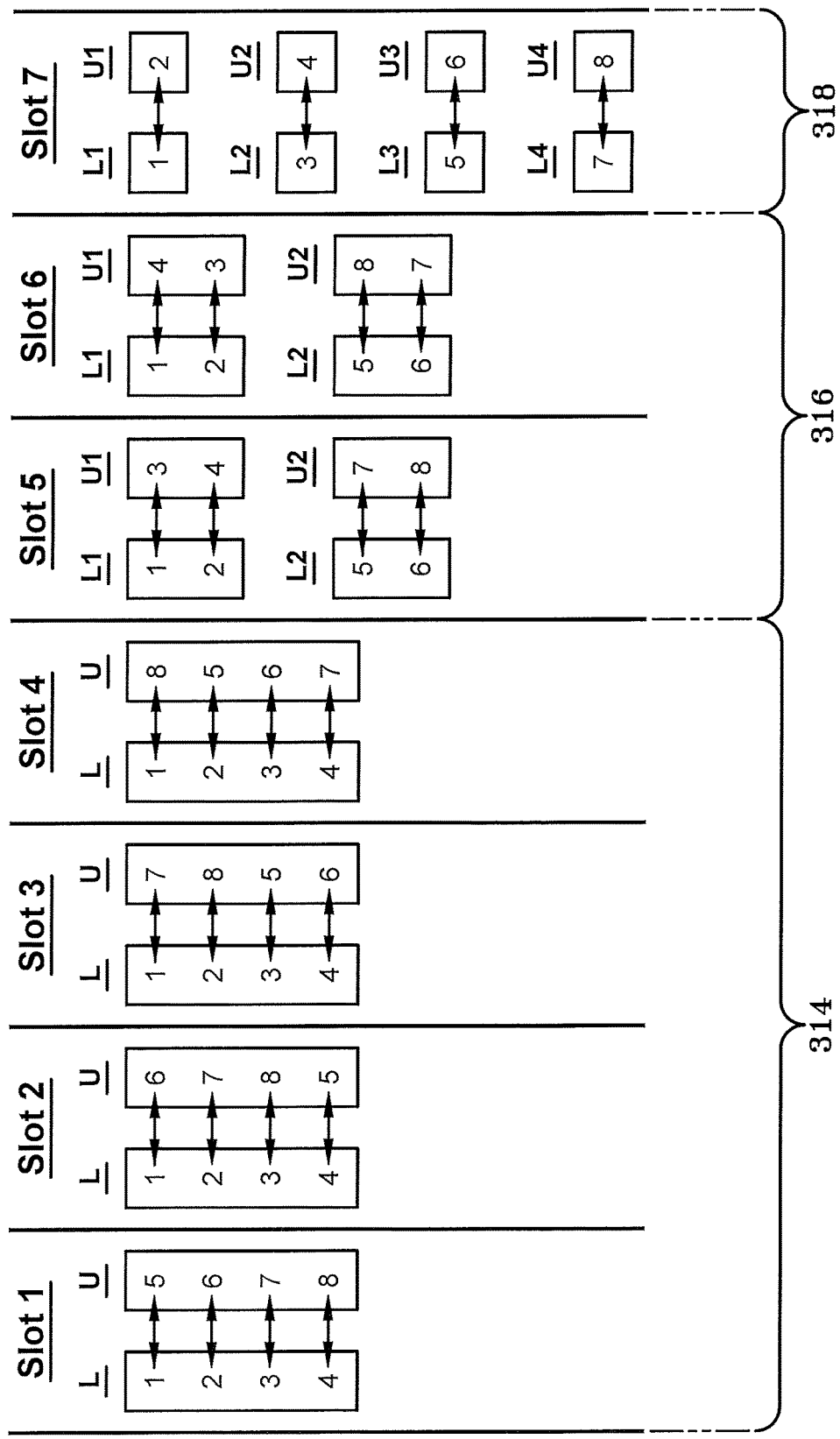
FIG. 5 is an exemplary graphical view of a transmission using a directional MANET frame structure and method in accordance with an aspect of the present disclosure, where the system includes eight nodes and seven slots and showing the various transmissions when frequency domain duplexing (FDD) is used.

The number of iterations (partitions) is determined by $ceil(Log_2(N))$, where N is the number of nodes, $Log_2$ is a log base 2, and ceil is the smallest integer larger than the argument. For instance, if there are 8 nodes, then 3 iterations (partitions) are required to accomplish the method. This is graphically illustrated in FIG. 5. Particularly, as shown in FIG. 5, after each iteration (partition), the number of groups increases by a factor of two because each group is divided into two subgroups. Thus, after the first iteration (partition) 314, there are two groups. After the second iteration (partition) 316, there are four groups. After the third iteration (partition) 318, there are eight groups. Since there are less nodes in each subgroup as the iterations continue, it will take less slots to complete the transmissions required at each iteration. Each time the number of slots required to exchange data would decrease by roughly a factor of two until only one node exists in each subgroup. When each group has one node, as shown at step 414 in FIG. 4, the method would be terminated with all nodes having broadcasted to all of the other nodes in the network.

Generally, when there are a total number nodes (N) which is equivalent to power of 2 ($2^n$) (i.e., N=2, 4, 8, 16, 32, 64 etc.), then $2*(N-1)$ slots are required to complete all transmissions so that all nodes hear broadcasts from all of the other nodes if they are in communications range. In one instance, if there is a total of two nodes, then there should be at least two slots to complete all transmissions. In another instance, if there is a total of four nodes, then there should be six slots to complete all transmissions. In another instance, if there is the total of eight nodes, then there should be at least fourteen slots. However, when frequency domain duplexing (FDD) is used, then the total number of slots become N−1 so that one slot is required for two nodes, three slots are required for four nodes, and seven slots are required for eight nodes, respectively.

Furthermore, if there are a total number of nodes (N) where the total number of nodes are more than $2^{(n-1)}$ but less than $2^n$ with n being the integer, then the total number of required slots is bounded by $2*N+2*ceil(Log_2(N))$, where N is the number of nodes, $Log_2$ is a log base 2, and ceil is the smallest integer larger than the argument. For example, if the total numbers of nodes are five, six and seven which are between four and eight (i.e., n=3), the maximum total number of slots may be 16, 18, and 20, respectively. When frequency domain duplexing (FDD) is used, the total number of slots become $N+ceil(Log_2(N))$. Thus, for a specific maximum number of nodes in a network, the exact number of slots required may be pre-computed.

Figure 5A:
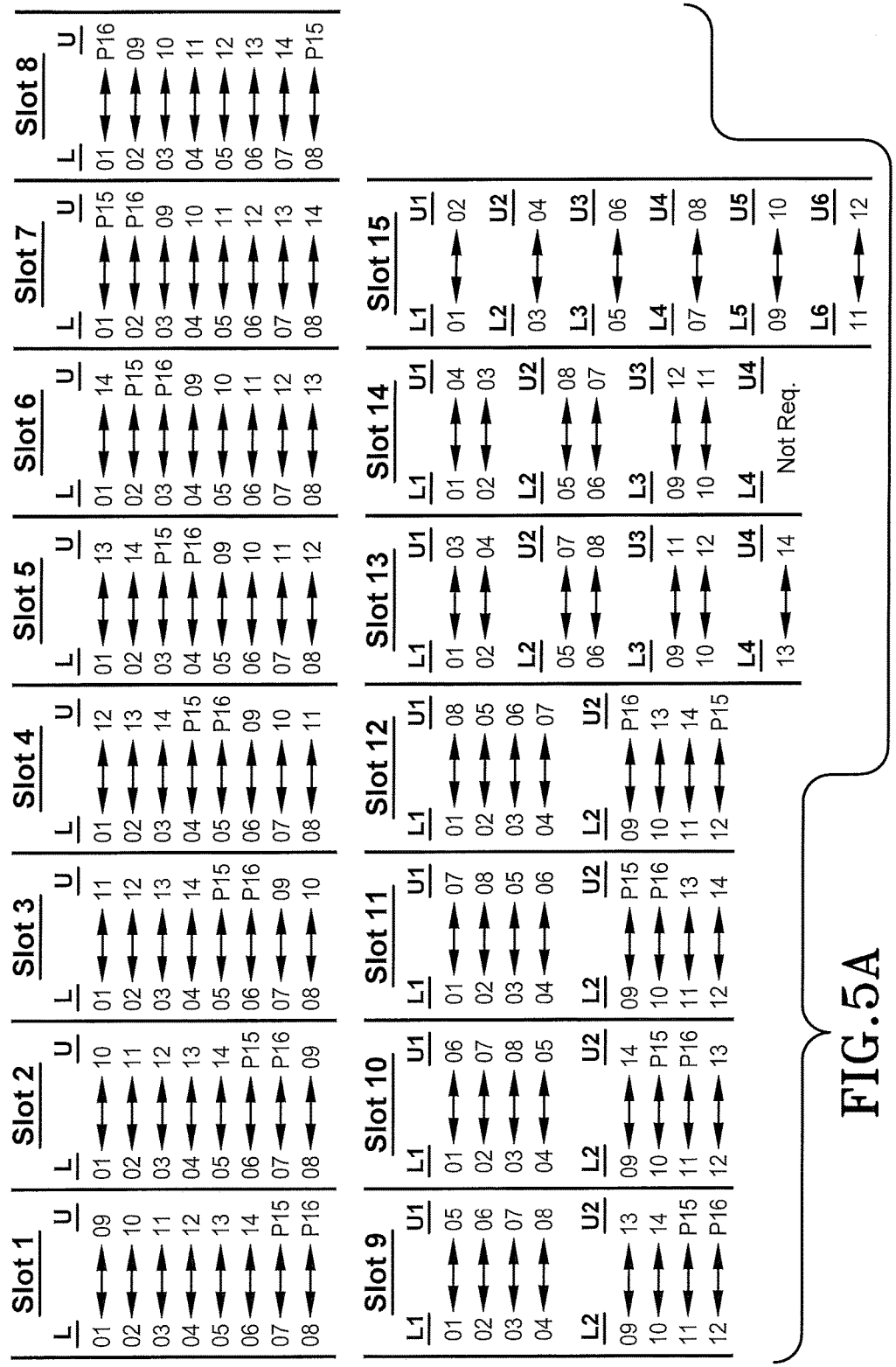
FIG. 5A is an exemplary graphical view of a transmission using a directional MANET frame structure and method in accordance with an aspect of the present disclosure, where the system includes fourteen nodes in total, frequency domain duplexing (FDD) is used, and wherein phantom nodes are introduced in a first round of transmissions.

However, the maximum total number of slots may be varied depending on how many phantom nodes must be introduced and when the phantom nodes are introduced. Numbers of phantom nodes may be introduced in the first round of transmissions of each iteration (partition) to get the total number of nodes to be equal to a power 2. Alternatively, a number of phantom nodes may be introduced as needed during the process. For example, as depicted in FIG. 5A, when there are a total of 14 nodes, two phantom nodes (P15 and P16) may be introduced at the first slot (i.e., "Slot 1") to get the total number of nodes to be 16 which is within a power 2 (i.e., $2^4$). Alternatively, as depicted in FIG. 5B, two phantom nodes (P08 and P15) may be introduced at the eighth slot (i.e., "Slot 8"). Generally, introducing phantom nodes in the first round is less efficient than introducing phantom nodes as they are needed.

Figure 6A:
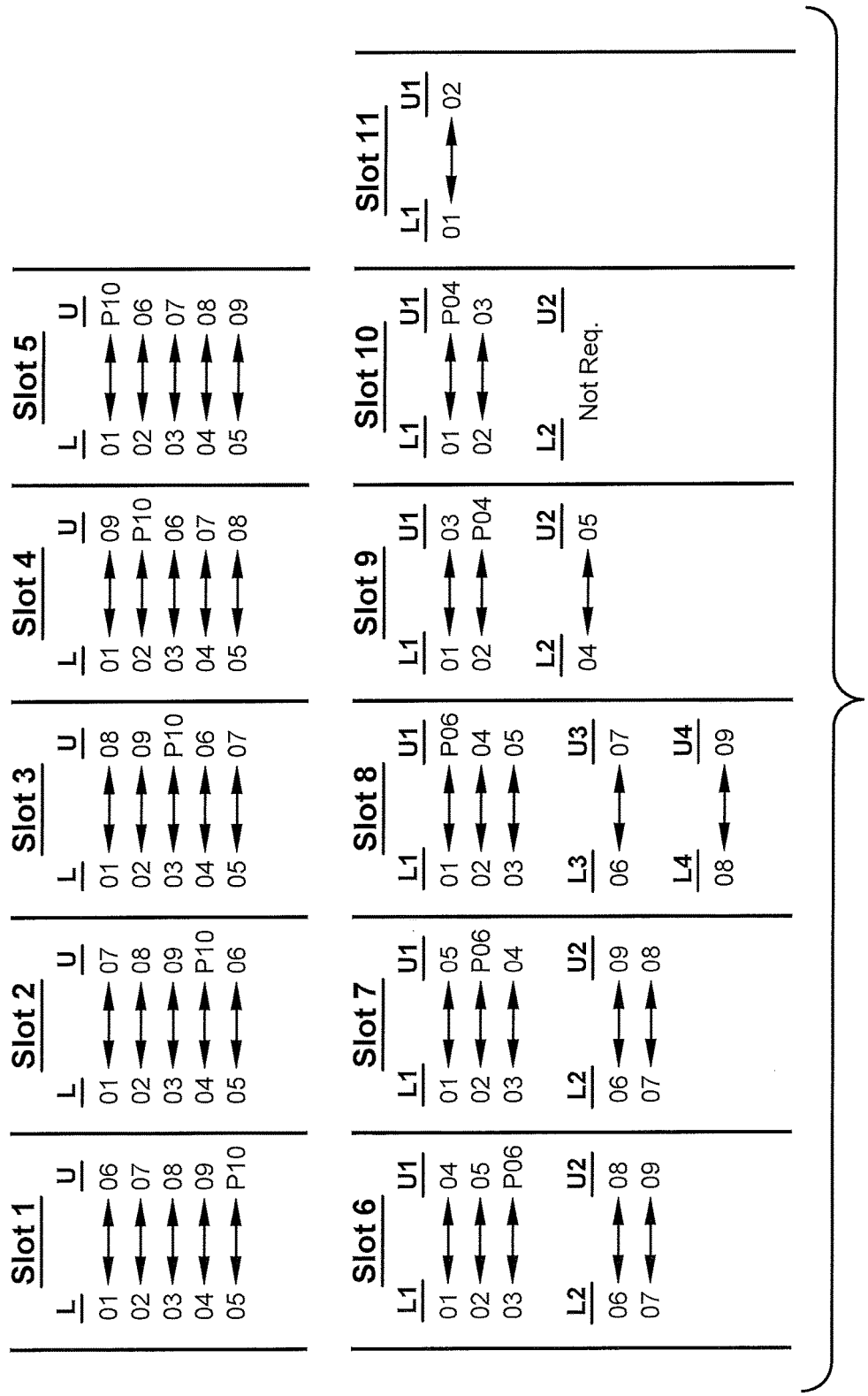
FIG. 6A is an exemplary graphical view of a transmission using a directional MANET frame structure and method in accordance with an aspect of the present disclosure, where the system includes nine nodes in total, frequency domain duplexing (FDD) is used, and wherein a decision to repartition smaller groups is made at a first opportunity.
Figure 6B:
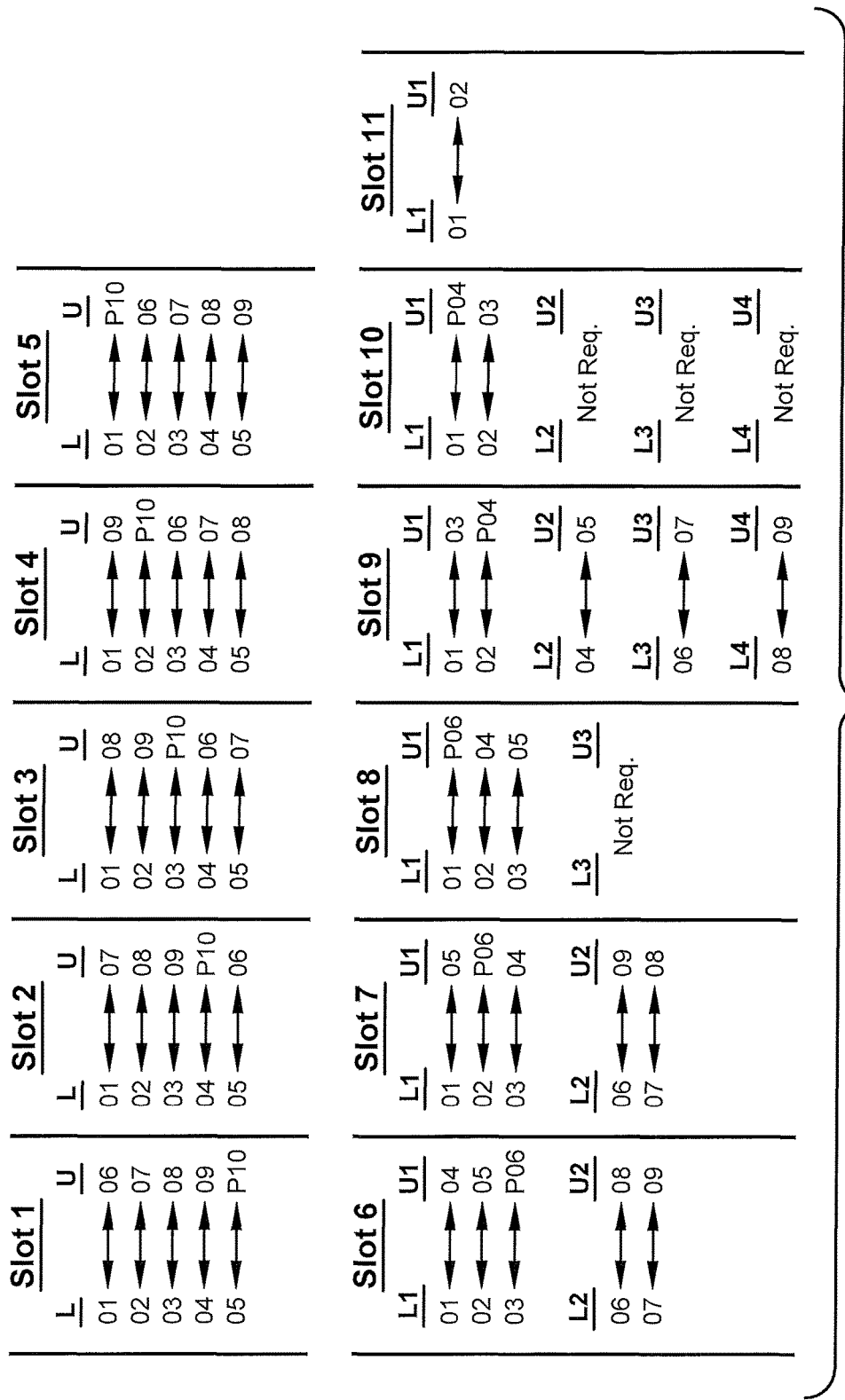
FIG. 6B is an exemplary graphical view of a directional MANET frame structure and method in accordance with an aspect of the present disclosure, where the system includes nine nodes in total, frequency domain duplexing (FDD) is used, and wherein a decision to repartition smaller groups is delayed until all groups are ready to be repartitioned.
Figure 6C:
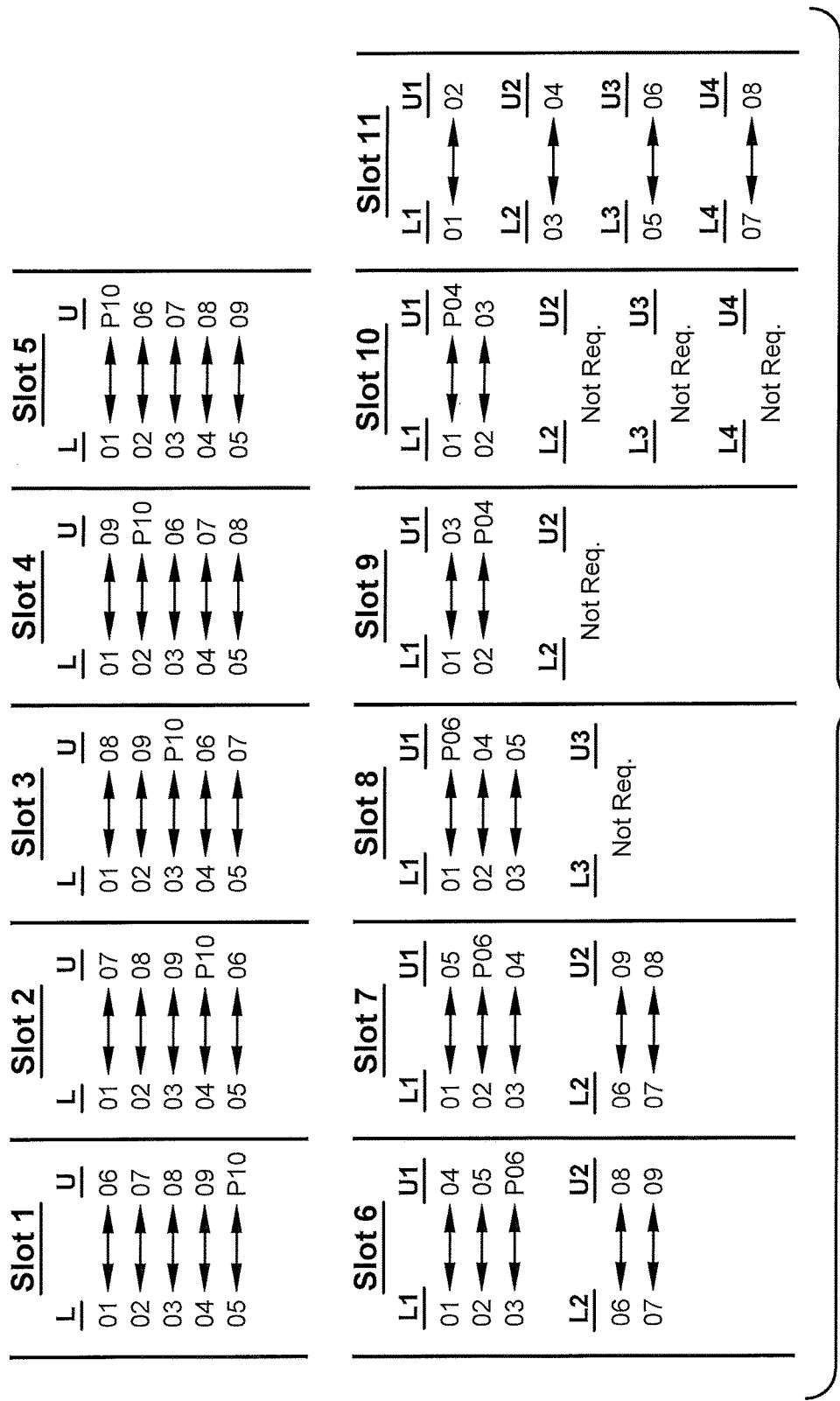
FIG. 6C is an exemplary graphical view of a directional MANET frame structure and method in accordance with an aspect of the present disclosure, where the system includes nine nodes in total, frequency domain duplexing (FDD) is used, and wherein a decision to repartition smaller groups is deferred until all groups are of a same size.

FIG. 6A is an exemplary graphical view of a transmission using a directional MANET frame structure and method in accordance with an aspect of the present disclosure, where the system includes nine nodes in total, frequency domain duplexing (FDD) is used, and wherein a decision to repartition smaller groups is made at a first opportunity. FIG. 6B is an exemplary graphical view of a directional MANET frame structure and method in accordance with an aspect of the present disclosure, where the system includes nine nodes in total, frequency domain duplexing (FDD) is used, and wherein a decision to repartition smaller groups is delayed until all groups are ready to be repartitioned. FIG. 6C is an exemplary graphical view of a directional MANET frame structure and method in accordance with an aspect of the present disclosure, where the system includes nine nodes in total, frequency domain duplexing (FDD) is used, and wherein a decision to repartition smaller groups is deferred until all groups are of a same size.

As indicated above, the decision to repartition a smaller group may be delayed until all of the current groups are ready to be repartitioned (as shown in FIG. 6B) or may be made at the first opportunity (as shown in FIG. 6A). As shown in FIG. 6A, repartitioning groups may be made after the seventh slot (i.e., "Slot 7") when the second lower subgroup (L2) and the second upper subgroup (U2) have their first opportunity to be repartitioned. Alternatively, as depicted in FIG. 6B repartitioning the second lower subgroup (L2) and the second upper subgroup (U2) may be delayed until the ninth slot (i.e., "Slot 9"). As shown in FIGS. 6A-6C, a first phantom node P10 is first introduced in Slot 1, a second phantom node P06 is first introduced in Slot 6, and a third phantom node P04 is first introduced in Slot 9.

When partitioning results in two different group sizes, the decision to repartition a smaller group may be deferred until all of the groups are of the same. As shown in FIG. 6A, the transmission between node 6 to node 7 as well as between node 8 and node 9 are implemented in Slot 8. However, the first lower group L1 and the upper group U1 have six nodes, and the third lower group L3 and the third upper group U3 and the fourth lower group L4 and the upper group U4 have two nodes, respectively. Thus, the transmission between node 6 and node 7 as well as the transmission between node 8 and node 9 may occur in any of Slot 8, Slot 9, Slot 10, and Slot 11.

While the method is useful for broadcasting information in a network of nodes with directional antennas, it can also be advantageously combined with other methods. For example, if some nodes have omni-directional antennas, and some nodes have directional antennas, it is useful for the nodes with omni-directional antennas to be allocated separately and not have them participate in the directional broadcasting program. Instead, each omni node would be allocated a dedicated slot as part of the BC zone and all directional nodes would position their antennas to try to receive from the omni node during that slot.

In certain embodiments, it is often useful to partition networks into subnets where a reduced number of nodes directly communicate to each other in each subnet. In such cases a gateway node can rebroadcast information from one subnet to another and vice versa. The gateway approach may be combined with the directional broadcasting approach to allow operations across subnets.

Also, there may be cases where because of node alignments with directional antennas, transmissions from multiple nodes are received simultaneously at a single receiver. Such situations may be resolved for instance by applying spread spectrum or multi-user detection techniques. Scheduling techniques can also be applied such as having nodes systematically defer to each other when they detect a potential conflict at a receiver. So if two nodes recognize that their transmissions will overlap for a given receiver, the higher address node would defer on odd frames, and the lower address would defer on even frames. If no extra slots are allocated, this would result in a reduced (but often acceptable) rate of broadcast for the impacted nodes. Alternatively, deferral slots could be added at the end of the BC that would be used as needed such that the deferring nodes are not necessarily penalized in broadcast throughput.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the disclosure is not limited to the exact details shown or described.

What is claimed:

1. A method of broadcasting information in a network comprising:
    providing a Mobile Ad-hoc Network (MANET) that includes a plurality of nodes, wherein at least some of the nodes use a directional antenna;
    ordering the plurality of nodes in the MANET, wherein ordering the nodes includes ordering the nodes by address;
    partitioning the plurality of nodes into a first group of nodes and a second group of nodes, wherein the partitioning is based on the address of the nodes;
    transmitting information from each node in the first group of nodes to a corresponding node in the second group of nodes, wherein the corresponding node in the second group has a respective address as the node in the first group; and
    reversing direction of transmitting by transmitting information from each node in the second group of nodes to a corresponding node in the first group of nodes.

2. The method of claim 1, wherein the step of ordering by address includes placing lower address nodes into the first group of nodes and placing higher address nodes into the second group of nodes.

3. The method of claim 1, wherein the step of ordering the nodes by address includes ordering the addresses in ascending order.

4. The method of claim 1, further comprising allocating slots in the network.

5. The method of claim 4, further comprising determining an order of transmission from the slots.

6. The method of claim 1, wherein the step of transmitting information between each node in the first group of nodes and the corresponding nodes in the second group of nodes occurs simultaneously.

7. The method of claim 1, further comprising:
    verifying that all nodes in the first group of nodes have communicated with all nodes in the second group of nodes.

8. The method of claim 7, further comprising:
    permuting the first group of nodes and the second group of nodes if all nodes in the first group of nodes have not communicated with all nodes in the second group of nodes.

9. The method of claim 8, further comprising:
    repeating the steps of transmitting information from each node in the first group of nodes to a corresponding node in the second group of nodes; reversing the direction of transmitting and verifying that all nodes in the first group of nodes have communicated with all nodes in the second group of nodes until all nodes in the first group of nodes have communicated with all nodes in the second group of nodes.

10. The method of claim 7, further comprising:
    verifying that there is only one node in each of the first group of nodes and each of the second group of nodes after the step of verifying that all of the nodes in the first group of nodes have communicated with all of the nodes in the second group of nodes.

11. The method of claim 10, further comprising:
    repartitioning the first group of nodes into a first subgroup of nodes and a second subgroup of nodes and repartitioning the second group of nodes into a third subgroup of nodes and a fourth subgroup of nodes when the first group of nodes or the second group of nodes includes more than one node.

12. The method of claim 11, wherein the step of repartitioning occurs when the step of permutation is ended.

13. The method of claim 1, wherein the step of partitioning the nodes into the first group of nodes and the second group of nodes includes providing at least one phantom node.

14. The method of claim 13, wherein the step of providing at least one phantom node occurs when a total number of the nodes in the first group of nodes or the second group of nodes is an odd number.

15. The method of claim 13, wherein the step of providing the at least one phantom node is undertaken to provide a total number of nodes equal to a power of two.

16. The method of claim 13, the step of providing at least one phantom node is further accomplished by providing the least phantom nodes as needed.

17. The method of claim 1, wherein the MANET includes one omni-directional antenna.

18. A method of broadcasting information in a network comprising:
    providing a Mobile Ad-hoc Network (MANET) that includes nodes, wherein at least some of the nodes use a directional antenna;
    ordering the nodes in the MANET, wherein ordering the nodes includes ordering the nodes by address;
    determining a total number of the nodes;

partitioning the nodes into a first group of nodes and a second group of nodes, wherein the partitioning is based on the address of the nodes;

transmitting information from each node in the first group of nodes to a corresponding node in the second group of nodes, wherein the corresponding node in the second group has a respective address as the node in the first group;

reversing direction of transmitting by transmitting information from each node in the second group of nodes to a corresponding node in the first group of nodes;

verifying that all nodes in the first group of nodes have communicated with all nodes in the second group of nodes;

permuting the first group of nodes and the second group of nodes if all nodes in the first group of nodes have not communicated with all nodes in the second group of nodes;

repeating the steps of transmitting information from each node in the first group of nodes to a corresponding node in the second group of nodes; reversing the direction of transmitting and verifying that all nodes in the first group of nodes have communicated with all nodes in the second group of nodes until all nodes in the first group of nodes have communicated with all nodes in the second group of nodes; and verifying that there is only one node in each of the first group of nodes and each of the second group of nodes after the step of verifying that all the nodes in the first group of nodes have communicated with all of the nodes in the second group of nodes.

19. The method of claim 18, wherein every node in the MANET uses a directional antenna.

* * * * *